Jan. 7, 1964  L. D. LORING, JR  3,117,088
METHOD OF LUBRICATING THE CLUTCH ASSEMBLY
OF AUTOMOBILE STARTER MOTORS
Filed April 25, 1960

INVENTOR
LEWIS D. LORING JR.

BY Adams, Forward and
McLean
ATTORNEYS

United States Patent Office 3,117,088
Patented Jan. 7, 1964

3,117,088
METHOD OF LUBRICATING THE CLUTCH ASSEMBLY OF AUTOMOBILE STARTER MOTORS
Lewis D. Loring, Jr., Dolton, Ill., assignor, by mesne assignments, to Sinclair Research Inc., New York, N.Y., a corporation of Delaware
Filed Apr. 25, 1960, Ser. No. 24,505
4 Claims. (Cl. 252—42)

This invention relates to a unique requirement of providing adequate lubrication but not permitting clutch slippage in the clutch assembly of automobile starter motors.

As in most clutch assemblies, those of the automobile starter motors must be lubricated to reduce friction and wear and to provide protection against rusting, contamination, etc. The lubrication of the clutch assemblies of automobile starter motors, however, has presented considerable difficulty for most known lubricants either allow clutch slippage in these assemblies during low temperature use and/or fail to provide adequate lubrication when employed over the normal range of operating temperatures encountered during the seasons of the year. The only lubricant to my knowledge which has heretofore been found completely satisfactory is a silicone fluid thickened to grease consistency with a lithium stearate soap. This lubricant, however, is quite costly so that the search for other satisfactory lubricants for these clutch assemblies continues.

I have now found that slippage in the clutch assemblies of automobile starter motors can be prevented at low temperatures and satisfactory lubrication provided throughout the normal range of temperatures encountered during use over the seasons of the year by lubricating the clutch assembly with a special grease composition. This product includes as the major portion a base oil made up of a mixture of a mineral lubricating oil and a synthetic ester lubricant, and a grease-forming alkali metal soap in an amount sufficient to thicken the base oil to grease consistency. It is essential to the present invention that the base oil contain a mineral oil and a synthetic ester oil, both of lubricating viscosity. Use of either oil alone will not produce a satisfactory lubricant for the present invention.

The mineral oil component of the base material is a refined petroleum oil of lubricating viscosity and can, for instance, be solvent extracted or solvent refined in accordance with conventional methods of solvent refining lubricating oils. Generally, such lubricating oils have viscosities from about 35 to 250 SUS at 210° F. The mineral oil can be derived from paraffinic, naphthenic, asphaltic or mixed base crudes, and if desired, a blend of solvent treated Mid-Continent neutrals may be used.

The synthetic lubricating oil component of the base material is of the ester type, for instance, the complex esters, diesters, monoesters, and polyester, prepared from aliphatic or aromatic acidic and alcoholic compounds. The dibasic acids employed to prepare the diesters, polyesters or complex esters will generally contain from about 2 to 28 carbon atoms. Suitable acids are described in U.S. Patent No. 2,575,195 and include branched or straight chain structures which are saturated or unsaturated. The preferred acids for use in making synthetic lubricants are the saturated aliphatic dibasic acids containing about 2 to 12 carbon atoms, preferably 6 to 10 carbon atoms, and mxtures of these acids. Such acids include succinic, adipic, suberic, azaleaic, and sebacic acids, and also "isosebacic" acid which is a mixture of $\alpha$-ethyl suberic acid, $\alpha,\alpha'$-diethyl adipic acid and sebacic acid. Others of the dibasic acids include brassic, brassylic, pentadecane-dicarboxylic acid, the $C_4$ to $C_{24}$ alkenyl succinic acids, diglycolic acid and thiodiglycolic acid.

In preparing polyesters, one mole of acid is reacted with about 0.7 to 1.5 moles of glycol, and preferably this ratio is about 1:1. The useful glycols include the aliphatic monoglycols of 3 to 12 carbon atoms, preferably 3 to 6 carbon atoms; and the polyglycols thereof having from about 1 to 50 ether oxygen atoms. Advantageously, the polyglycols contain from about 1 to 10 ether oxygen atoms. The preferred polyglycols include the polypropylene glycols and particularly useful ones of these have molecular weights from about 150 to 450. Others of the glycols are propylene glycol, butylene glycol, polybutylene glycols, decamethylene glycols and octylene glycols. Preferably, the glycol hydroxy radicals are primary or terminal but they can be otherwise placed in the molecule. Also, the glycols can be straight or branched chain, for instance, as in 2-ethyl-1,3-hexanediol,2-methyl-1,3-pentanediol, 2-propyl-1,3-heptane-diol, 2-butyl-1,3-butanediol. The 2,2-dimethyl glycols, such as neopentyl glycol have been shown to impart even greater heat stability to lubricants. Minor amounts of other glycols or other materials can be present as long as the desired properties of the product are not unduly deleteriously affected.

In preparing complex esters, one mole of glycol is reacted with two moles of the dibasic acid and two moles of a monohydric alcohol of up to about 20 carbon atoms, saturated or unsaturated, straight or branched chain. Preferably the alcohol is aliphatic and contains about 4 to 12 carbon atoms. Useful aliphatic alcohols include butyl, hexyl, methyl, 2-ethylhexyl, iso-octyl, and dodecyl alcohols, $C_{13}$ oxoalcohols and octadecyl alcohols. Here, it has been found that the use of alcohols having the "neopentyl" structure, i.e., 2,2-dimethyl substituted alcohols, such as neoctyl alcohol (2,2,4-trimethyl pentanol-1) offer some improvement in the heat stability of the final lubricants. Complex esters can also be made in a two-step process by first reacting two moles of the dibasic acid with two moles of the monohydric alcohol. When this reaction is complete, one mole of the glycol is added and thoroughly reacted with the intermediate.

Diesters are made by using one mole of dibasic acid and two moles of a monohydric alcohol such as those listed above. Some specific mono- and diesters which can be made by the process of this invention are ethyl palmitate, ethyl stearate, di-(2-ethylhexyl) sebacate, di-iso-octyl azelate, ethylene glycol di-laurate, di-(2-ethylhexyl) phthalate, di-(1,3-methylbutyl) adipate, di-(2-ethylbutyl) adipate, di-(1-ethylpropyl) adipate, diethyl oxylate, glycerol tri-n-octoate, di-cyclohexyl adipate, di-(undecyl) sebacate, tetraethylene glycol-di-(2-ethylene hexoate), di-Cellosolve phthalate, butyl phthalyl butyl glycolate, dibenzyl sebacate, and diethylene glycol bis (2-n-butoxy ethyl carbonate).

The monoesters are prepared by reacting one mole of aliphatic monocarboxylic acid of 2 to 24 carbon atoms, preferably 12 to 18 carbon atoms, and a monohydric alcohol such as those listed above.

Various useful ester base oils are disclosed in U.S. Patents Nos. 2,499,983; 2,499,984; 2,575,195; 2,575,196; 2,703,811; 2,705,724 and 2,723,286. Generally, the synthetic base oils consist essentially of carbon, hydrogen and oxygen, i.e., the essential nuclear chemical structure is formed by these elements alone. Moreover, these oils may be substituted with other elements such as halogens, e.g., chlorine and fluorine.

In a preferred reaction, about 0.5 to about 1 weight percent, or advantageously, 0.2 to 0.5% of the catalyst is used with a xylene solvent at a temperature of 165 to 200° C. while refluxing water. The temperatures of the reaction must be sufficient to remove the water from the esterification mass as it is formed. This temperature is usually at least about 140° C. but no so high as to decompose the wanted product. The highest temperature needed for the reaction will probably be about 200° C., preferably not over about 175° C. The pressure is conveniently about atmospheric. Although reduced pressure or superatmospheric pressure could be utilized, there is usually no necessity to use reduced pressures, as the temperatures required at atmospheric pressure to remove the water formed do not usually unduly degrade the product.

When reacting glycols with dibasic acids to produce a polyester, it is preferred to continue the reaction with concomitant boiling off of water from the reaction mixture until the polyester product has a kinematic viscosity of about 15 to 200 centistokes at 210° F., preferably about 40 to 130 centistokes. When this point has been reached, the polymerization can be stopped, for instance, by adding a "capping alcohol" to the reaction mixture, and continuing to reflux until water ceases to be evolved. The capping alcohol is a low molecular weight mono-alcohol of up to about 20 carbon atoms. It is standard practice, when esters are made using the conventional acid catalysts such as sodium bisulfate or paratoluenesulfonic acid to give the esters an after-treat by washing the ester with a 5 percent aqueous $K_2CO_3$ solution or by heating the ester in an autoclave for 15 hours at 340 to 350° F. with 10 weight percent of propylene oxide. It is also conventional to subject the ester to filtration to remove insoluble materials. After this the product may be subjected to a reduced pressure distillation or stripping at 100 to 200 C. to remove volatile materials, such as water, the solvent, and light ends.

The mineral oil and synthetic ester oils can be present in a ratio over a broad range of 1 to 9 parts mineral oil to 1 to 9 parts synthetic oil. It is preferred that the blend contains 2 to 4 parts mineral oil to 1 part synthetic ester oil, or 2 to 4 parts ester oil to 1 part of mineral oil.

The alkali metal soaps or mixtures thereof employed in the present invention to thicken the base oil blend to grease consistency are of conventional types, for instance, the lithium or sodium soaps of the ordinary saturated and unsaturated soap-forming fatty acids and fats including the hydrogenated fats and fatty acids. Also soaps of the soap-forming hydroxy fatty acids, as for example, 12-hydroxy stearic acid can be employed. Generally the fats and fatty acids contain about 12 to 20 carbon atoms. If a mixture of lithium and sodium soaps is employed, their ratio usually ranges from about 1 to 3:1. The soaps are present in an amount sufficient to thicken the base oil blend to grease consistency. This is generally about 5 to 50, preferably about 10 to 25 percent by weight of the finished grease. Aside from the alkali metal soaps, minor amounts of soaps of other metals can be included.

Premium grease compositions characteristically are substantially anhydrous, i.e., the finished greases have a water content below about 0.50 weight percent and preferably below about 0.20 weight percent. Grease compositions of the instant invention also are substantially anhydrous. Dehydration to result in this state can be accomplished in any manner but preferably by maintaining the temperature above the boiling point of water, preferably about 300 to 340° F., for about 3 to 6 hours. While dehydration can be effected after finishing oil has been added, it is preferred to dehydrate prior to the addition of finishing oil in order that less material need be handled.

Materials normally incorporated in greases to impart special characteristics can be added to my compositions. These include oxidation inhibitors, corrosion inhibitors, and anti-wear agents. The amount of additives added to the grease compositions usually ranges from about 0.01 weight percent up to about 10 weight percent and, in general, can be employed in any amounts desired so long as the present invention is not deleteriously affected.

If desired the grease composition of the present invention can be made by blending different base oil greases, for instance, a grease comprising a mineral oil thickened with a soap of the present invention with a grease comprising a synthetic ester oil thickened with a soap of the present invention, so long as the final grease blend contains the constituents of the lubricant of my invention and in the defined proportions. Also the soaps can be formed in situ, or they can be pre-made separately or as mixtures.

FIGURE 1 is a side elevational view of a conventional starting assembly partially broken away at the forward end; and FIGURE 2 is an enlarged fragmentary view taken along line 2—2 of FIGURE 1 with parts broken away.

Figure 1:
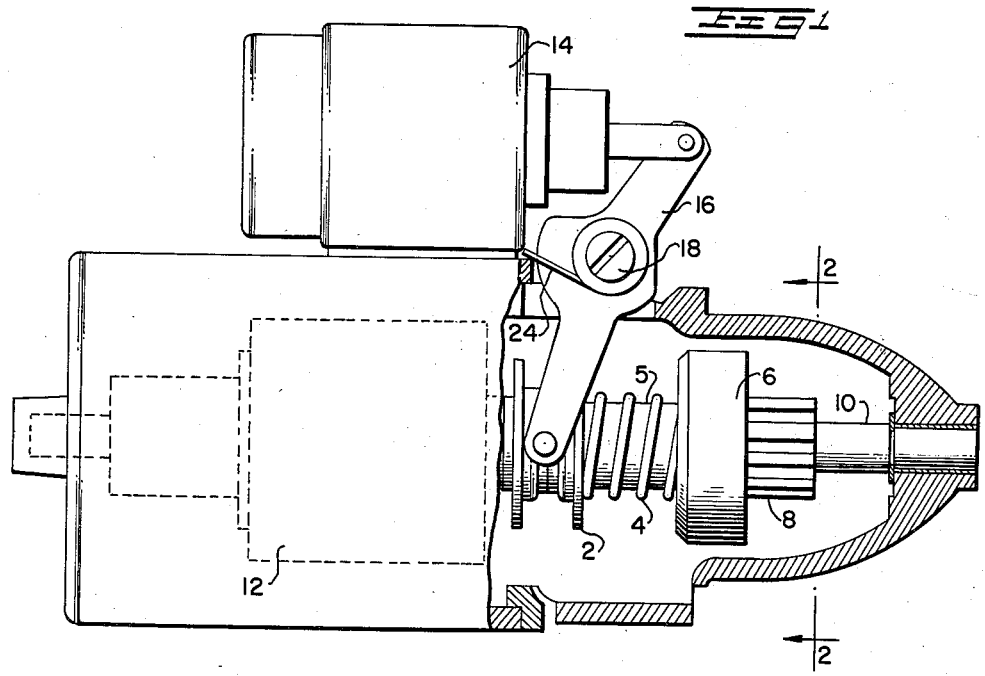
FIGURES 1 and 2 are included to illustrate a typical starter motor clutch assembly which can be lubricated with the grease of the present invention.
Figure 2:
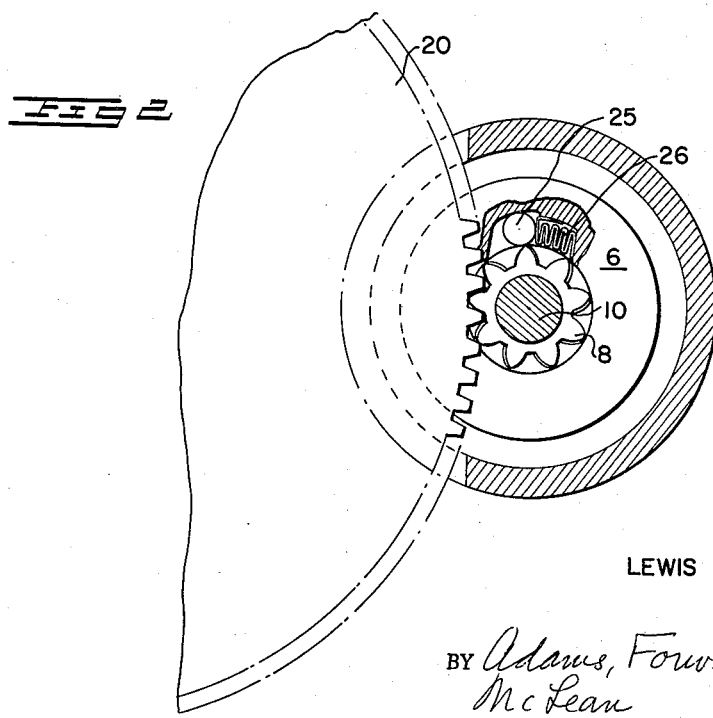

Referring to the figures, the motor clutch assembly comprises clutch collar 2, spring 4, clutch shaft 5, drive housing 6 and pinion 8 slidably mounted on armature shaft 10 of armature 12. The armature shaft is provided near its base with spiral splines (not shown) which engage helical grooves (also not shown) on the underside of the rear portion of clutch shaft 5 so that the clutch assembly may rotate upon rotation of the armature shaft. In operation, the armature 12 is actuated to turn the armature shaft and the clutch assembly. At the same time solenoid 14 is energized and rocks the crank arm 16 about the pivot 18 to move the motor clutch assembly into engagement with the flywheel gear 20 (see FIGURE 2). Upon deenergizing the solenoid, the crank arm 16 disengages the clutch assembly from the flywheel gear 20 by means of return spring 24. The part of the motor assembly lubricated with the grease of the present invention is illustrated in FIGURE 2 and contains roller 25 and spring means 26 which restrain and permit free flow of the pinion 8 during operation. Further description of the above-described motor starter assembly can be found in Cadillac Shop Manual, 1956, Cadillac Motor Car Division, General Motors Corporation, Copyright 1955, hereby incorporated by reference.

The following examples further illustrate the greases of my invention:

*Example I*

A grease was prepared from the following materials.

Materials, weight percent:

| | |
|---|---:|
| Hydrogenated fish oil acids | 6.80 |
| Special acidless tallow | 9.92 |
| Special tallow fatty acid | 2.70 |
| Flake caustic | 2.90 |
| Mineral oil [1] | 19.42 |
| Di-iso-octyl azelate | 58.26 |
| | 100.00 |
| Agerite Resin D [2] | +0.50 |
| Ortholeum 300 | +0.50 |

[1] Mineral oil—200 SUS at 100° F. viscosity, 95 V.I. solvent refined Mid-Continent neutral.
[2] Trimethyldihydroquinoline polymer.

The procedure employed was as follows:

The fat mixture and all the mineral oil (ratio of 1:1) was charged to a grease kettle and heated to 190° F. Hot caustic solution (flake caustic dissolved in water) was added slowly and the kettle heated to between 210 to 230° F. for 3 hours. The temperature was then increased to 320° F. for dehydration and maintained at that temperature for 4 hours. After dehydration, heating was stopped and di-iso-octyl azelate synthetic oil blended in during cooling. Agerite Resin D was added at 250° F. and Ortholeum 300 at 190° F. while stirring. Agitation was stopped and the grease cooled to under 100° F. Grease is then kettle milled to smooth texture.

The grease thus preapred was subjected to the (1) clutch slippage test at —20° F. and (2) the clutch endurance cranking test. The clutch slippage test involves lubricating the clutch assembly of the automobile starter motor with the grease to be tested and subjecting the clutch to 325 cranking attempts at a temperature of —20° F. A successful grease gives no slippage in this test. The clutch endurance cranking test consists of lubricating the clutch with the grease to be tested and subjecting the clutch to 30,000 cycles at ambient temperatures. A satisfactory grease gives adequate lubrication throughout the test. This test is made with a complete engine and is calculated to approximate the number of engine starts in normal car life.

The grease of Example I passed both tests.

*Example II*

A grease designated A was prepared. Grease A contained the following materials.

Materials, weight percent:
| | |
|---|---|
| 12 hydroxy stearic acid | 15.00 |
| Lithium hydroxide monohydrate | 2.22 |
| Di-iso octyl azelate | 82.78 |
| | 100.00 |
| Trimethyldihydroquinoline polymer | +0.50 |
| Ortholeum 300 | +0.50 |

The procedure employed in the preparation of grease A was as follows:

The 12-hydroxy stearic acid was melted with 5 parts starting oil in a grease kettle. Cooling water was turned on to bring the temperature of the contents below 110° F. while mixing to a uniform mushy consistency. With the cooling water on to prevent saponification of the diester oil, the lithium hydroxide solution was added and the contents mixed cold for ½ hour. Steam was applied and the mixture dehydrated at a temperature of about 330° F. While cooling, the trimethyldihydroquinoline polymer was added at 260 to 300° F. The Ortholeum was added at 180 to 200° F. Ortholeum 300 is a well-known commercial oxidation inhibitor containing a mixture of alkyl-phenylamines, principally the alkyl-substituted diphenylamines. The mixture was colloid milled at 0.005" and 160° F. and the consistency adjusted to 265 to 295 W.P.

The grease A was subjected to the clutch slippage test at —20° F. and the endurance cranking test. It passed the clutch slippage test but failed the endurance cranking test after about 15,000 cycles.

A commercial grease B was also subjected to the two tests. Commercial grease B was a mixed sodium-calcium soap thickened grease containing 22 to 25% soap, approximately 64% of a 228 SUS at 100° F. viscosity, 62.9 viscosity index mineral lubricating oil, 6.59% of a synthetic diester oil and 3% inhibitors. Grease B passed the endurance cranking test but failed the clutch slippage test.

*Example III*

The finished greases A and B of Example II were polymer was added at 260 to 300° F. The Ortholeum comprising 75 weight percent of grease A and 25 weight percent of grease B.

The grease blend was then subjected to the clutch slippage test and the endurance cranking test, and was found to pass both tests.

*Example IV*

A grease C was prepared from the following materials.

Materials, weight percent:
| | |
|---|---|
| Hydrogenated fish oil acids | 6.86 |
| Special acidless tallow | 10.04 |
| Special tallow fatty acids | 2.75 |
| Hydrated lime | 0.38 |
| Flake caustic | 2.32 |
| Mineral oil [1] | 77.65 |
| | 100.00 |
| Plexol B [2] | +0.50 |
| Octylated arylalkylated diphenylamine | +0.50 |

[1] Mineral oil—300 SUS at 100° F. viscosity blend of solvent refined neutral and bright stocks.
[2] Ortho dimethyl amino p-butyl phenol oxidation inhibitor.

The procedure employed for the preparation was as follows:

The fat mixture, water and equal portion of the mineral oil were charged to a grease kettle and heated to 190° F. Lime slurried in the oil was added to a portion of the acids at 190 to 200° F. over a period of about an hour. Caustic solution was added and the remaining materials saponified between 190° and 210° F. over about 3 hours. The temperature was then increased to 320° F. for dehydration and maintained at that temperature for about 4 hours. The remaining mineral oil was added during cooling and the inhibitors (Plexol B and octylated arylalkylated diphenylamine) incorporated at 190° F. After cooling to under 100° F. the grease was kettle milled to smooth texture.

25% of grease C was blended with 75% of grease A of Example II and the grease blend was then subjected to the clutch slippage test and the endurance cranking test. The grease blend was found to pass both tests.

Another satisfactory grease is a straight soap grease in a blend of 75% mineral oil and 25% di-propylene glycol di-pelargonate synthetic oil. The grease includes the following materials.

Materials, weight percent:
| | |
|---|---|
| Hydrogenated fish oil acids | 8.70 |
| Special acidless tallow | 13.06 |
| Flake caustic | 3.20 |
| Mineral oil [1] | 56.28 |
| Dipropylene glycol di-pelargonate | 18.76 |
| | 100.00 |
| Agerite resin D [2] | +0.50 |
| Ortholeum 300 | +0.50 |

[1] Mineral oil—200 SUS at 100° F., 95 V.I. solvent refined Mid-Continent neutral.
[2] Trimethyldihydroquinoline polymer.

The procedure employed for the preparation of the grease was the same as that of Example I with the following exceptions: (1) the synthetic ester oil employed was dipropylene glycol, dipelargonate, (2) a portion of mineral oil equal to fat mixture was used as a starting oil and the finishing oil was a mixture of remaining mineral oil and the synthetic oil.

I claim:

1. A method of lubricating without permitting clutch slippage in the clutch assembly of automobile starter motors which comprises lubricating said assembly with a grease consisting essentially of a base oil blend comprising 1 to 9 parts of a mineral oil of lubricating viscosity and 1 to 9 parts of a synthetic ester oil of lubricating viscosity, and a grease-forming soap selected from the group consisting of lithium and sodium in an amount sufficient to thicken the base oil blend to grease consistency.

2. The method of claim 1 wherein the base oil blend consists essentially of 2 to 4 parts of the synthetic ester oil of lubricating viscosity to 1 part of the mineral oil of lubricating viscosity.

3. The method of claim 2 wherein the grease-forming soap is a sodium soap.

4. The method of claim 1 wherein the base oil blend consists essentially of 2 to 4 parts of the mineral oil of lubricating viscosity to 1 part of the synthetic ester oil of lubricating viscosity.

References Cited in the file of this patent

UNITED STATES PATENTS

| | | |
|---|---|---|
| 2,450,221 | Ashburn et al. | Sept. 28, 1948 |
| 2,521,438 | Zimmer et al. | Sept. 5, 1950 |
| 2,639,266 | Dilworth et al. | May 19, 1953 |

UNITED STATES PATENT OFFICE
CERTIFICATE OF CORRECTION

Patent No. 3,117,088                 January 7, 1964

Lewis D. Loring, Jr.

It is hereby certified that error appears in the above numbered patent requiring correction and that the said Letters Patent should read as corrected below.

Column 5, line 69, for "polymer was added at 260 to 300° F. The Ortholeum" read -- blended cold in a conventional grease kettle; the blend --.

Signed and sealed this 23rd day of June 1964.

(SEAL)
Attest:

ERNEST W. SWIDER
Attesting Officer

EDWARD J. BRENNER
Commissioner of Patents